United States Patent [19]

Zander

[11] Patent Number: 5,555,054
[45] Date of Patent: Sep. 10, 1996

[54] FILM LOADING/UNLOADING DESIGN FOR PHOTOGRAPHIC CAMERA

[75] Inventor: Dennis R. Zander, Penfield, N.Y.

[73] Assignee: Eastman Kodak Company, Rochester, N.Y.

[21] Appl. No.: 370,592

[22] Filed: Jan. 9, 1995

[51] Int. Cl.⁶ .............................. G03B 1/00; G03B 17/02
[52] U.S. Cl. ............................ 354/212; 354/214; 354/288
[58] Field of Search ................................... 354/212, 214, 354/275, 288

[56] References Cited

U.S. PATENT DOCUMENTS

| | | | |
|---|---|---|---|
| 3,955,771 | 5/1976 | Ishii et al. | 242/71.2 |
| 4,755,842 | 7/1988 | Barclay et al. | 354/217 |
| 4,779,111 | 10/1988 | Ogawa et al. | 354/173.11 |
| 4,780,734 | 10/1988 | Ogawa et al. | 354/173.11 |
| 4,833,495 | 5/1989 | Ohmura et al. | 354/212 |
| 4,974,787 | 12/1990 | Arai et al. | 354/212 |
| 5,148,198 | 9/1992 | Shiba | 354/319 |
| 5,202,713 | 4/1993 | Nakai et al. | 354/212 |
| 5,268,713 | 12/1993 | Kataoka | 354/288 |
| 5,357,303 | 10/1994 | Wirt | 354/275 |

*Primary Examiner*—Michael L. Gellner
*Assistant Examiner*—Eddie C. Lee
*Attorney, Agent, or Firm*—Roger A. Fields

[57] ABSTRACT

A simple camera is disclosed without any film cassette or film spool. Instead, a filmstrip is stored in unexposed and exposed film chambers on respective film rolls. A light lock/film guide is rotated open to load the filmstrip into the unexposed film chamber, is closed to direct the filmstrip to the exposed film chamber, and is reopened to unload the filmstrip.

10 Claims, 2 Drawing Sheets

FILM LOADING/UNLOADING DESIGN FOR PHOTOGRAPHIC CAMERA

FIELD OF THE INVENTION

The invention relates generally to the field of photography, and in particular to photographic cameras. More specifically, the invention relates to a film loading/unloading design for a photographic camera.

BACKGROUND OF THE INVENTION

Cameras with pre-loaded unexposed film, commonly referred to as single-use or disposable cameras, have recently become well known. Typically, the single-use camera is a simple point-and-shoot type which comprises a plastic light-tight inner body housing a fixed-focus taking lens, a film metering mechanism, a single blade shutter, a frame counter for indicating the number of exposures remaining for picture-taking, possibly a built-in electronic flash unit, and a decorative cardboard outer cover or casing containing the light-tight inner body and having respective openings for the taking lens, a shutter release button, a film advance thumbwheel, a direct see-through viewfinder, the frame counter, and a flash emission window. At the manufacturer, the light-tight inner body is loaded with a 12, 24, or 36 exposure 35 mm film cassette and substantially the entire length of the unexposed filmstrip is factory prewound from the cassette onto a spool in the inner body or simply into a roll. Then, after the photographer takes a picture, he or she manually rotates the thumbwheel to rewind the exposed frame into the cassette. The rewinding movement of the filmstrip the equivalent of slightly more than one frame width rotates a metering sprocket to decrement the frame counter to its next lower-numbered setting. Further details of this operation are disclosed in commonly assigned U.S. Pat. No. 5,235,366, issued Aug. 10, 1993, and in U.S. Pat. No. 4,890,130, issued Dec. 26, 1989. When the maximum number of exposures available on the filmstrip are exposed and the filmstrip is completely rewound into the cassette, the camera is given to a photofinisher who first disassembles or breaks open the single-use camera. Then, the photofinisher removes the cassette with the filmstrip from the inner body, separates the filmstrip from the cassette, and develops the negatives and makes prints for the customer. Also, the photofinisher forwards the disassembled camera to the camera manufacturer for recycling. The camera manufacturer, in turn, recycles the single-use camera in part by loading it with fresh unexposed film.

Prior art U.S. Pat. No. 5,148,198, issued Sep. 15, 1992, discusses the low efficiency of disassemblying or breaking open the single-use camera to obtain the unexposed filmstrip for processing, and proposes instead that the camera body be formed with a film-egress slot located adjacent an exposed film chamber. The film-egress slot is normally light tightly closed by a plate or door, which is opened to permit the filmstrip to be removed from the exposed film chamber. However, the single-use camera must be disassembled by the recycler to reload it with fresh unexposed film.

SUMMARY OF THE INVENTION

According to the invention, a photographic camera comprising a camera body formed with an unexposed film chamber and an exposed film chamber are storing a filmstrip on respective unexposed and exposed film rolls, is characterized by:

a film advancing device located between the unexposed film chamber and the exposed film chamber for engaging a filmstrip to longitudinally move the filmstrip to the unexposed film chamber; and an exterior film-ingress slot located on the camera body to permit a filmstrip to be longitudinally inserted through the film ingress slot at least to the film advancing device to allow the film advancing device to longitudinally move the filmstrip to the unexposed film chamber.

Also, there is provided a method of loading a filmstrip in a photographic camera and unloading the filmstrip from the camera, comprising the successive steps of:

longitudinally inserting a filmstrip through an exterior slot into the camera to load the filmstrip in the camera;

advancing the filmstrip in a forward direction from the exterior slot to an unexposed film chamber;

advancing successive sections of the filmstrip in a reverse direction from the unexposed film chamber to an exposed film chamber after each film exposure; and advancing the filmstrip from the exposed film chamber through the same or a different slot to unload the filmstrip from the camera.

DETAILED DESCRIPTION OF THE INVENTION

The invention is disclosed as being embodied preferably in a single-use camera. Because the features of a single-use camera are generally known, the description which follows is directed in particular only to those elements forming part of or cooperating directly with the disclosed embodiment. It is to be understood, however, that other elements may take various forms known to a person of ordinary skill in the art.

PREFERRED EMBODIMENT

Figure 1:
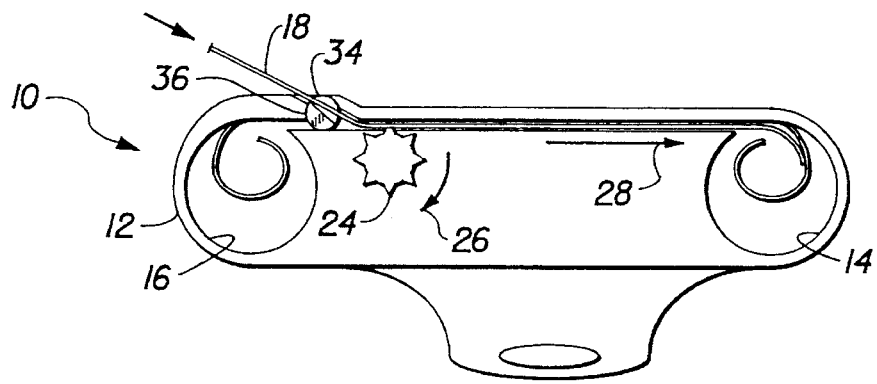
FIGS. 1–5 are schematic plan views of a preferred embodiment of a photographic camera with film, depicting a method of loading and unloading a filmstrip in and from the photographic camera.
Figure 2:
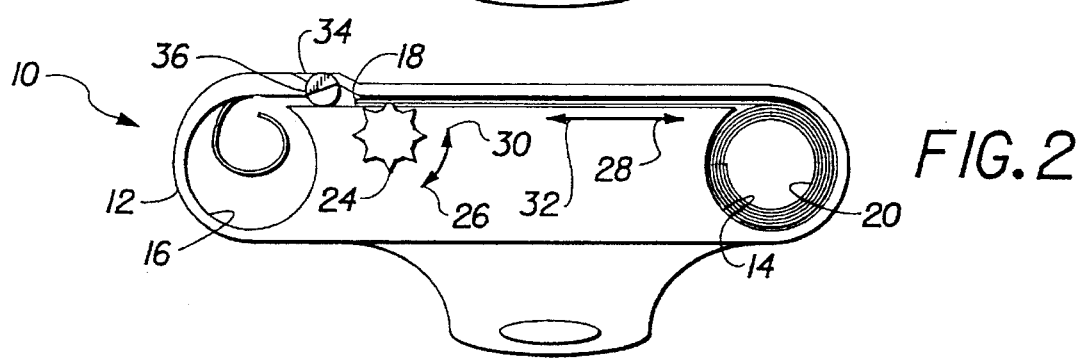
Figure 3:
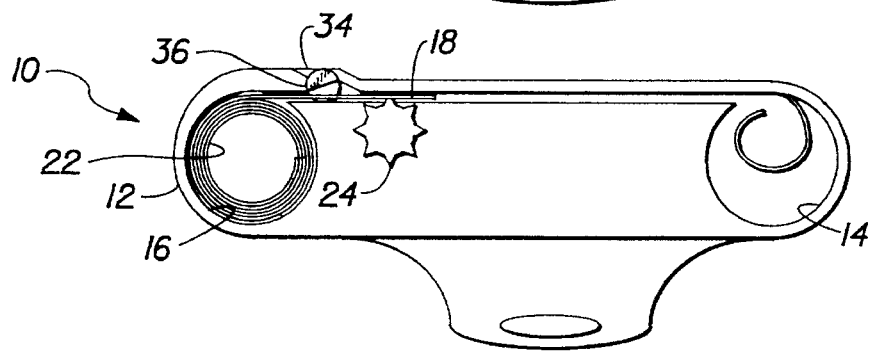

Beginning with FIGS. 1–5, a single-use camera 10 comprises a camera body 12 formed with an unexposed film chamber 14 and an exposed film chamber 16 for storing a 35 mm filmstrip 18 on respective unexposed and exposed film rolls 20 and 22. A multi-tooth film advancing sprocket 24, located between the unexposed and exposed film chambers 14 and 16, is rotatable in a forward sprocket direction 26 in engagement with the filmstrip 18 at successive film perforations, not shown, to longitudinally move the filmstrip in a forward film direction 28 to the unexposed film chamber as shown in FIGS. 1 and 2, and is rotatable in a reverse sprocket direction 30 in engagement with the filmstrip at the film perforations to longitudinally move the filmstrip in a reverse film direction 32 to the exposed film chamber as shown in FIGS. 2 and 3.

An exterior film-ingress/film-egress slot 34 is located on the rear of the camera body 12 to permit the filmstrip 18 to be longitudinally inserted through the slot to the film advancing sprocket 24, to allow the sprocket to longitudinally move the filmstrip in the forward film direction 28 to the unexposed film chamber 14 when the sprocket is rotated in engagement with the filmstrip in the forward sprocket direction 26. See FIGS. 1 and 2. Alternatively, the slot 34 permits the filmstrip 18 to be longitudinally moved out of the camera body 12 through the slot when the sprocket 24 is rotated in engagement with the filmstrip 18 in the reverse sprocket direction 30 to longitudinally move the filmstrip in the reverse film direction 32. See FIG. 5.

Figure 4:
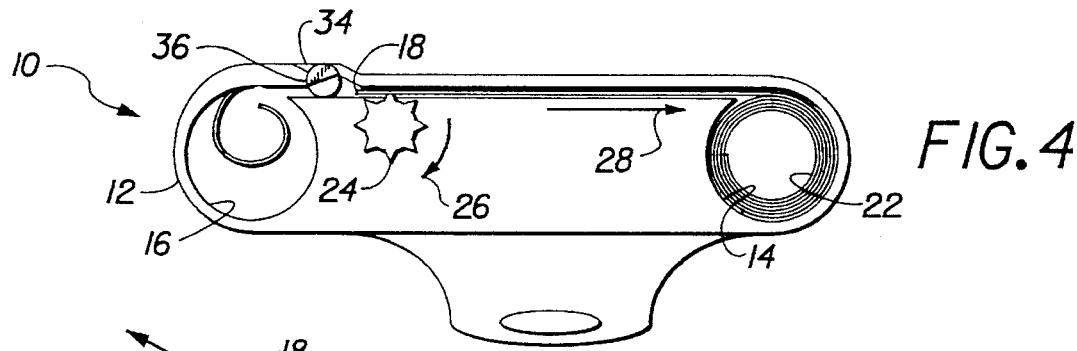
Figure 5:
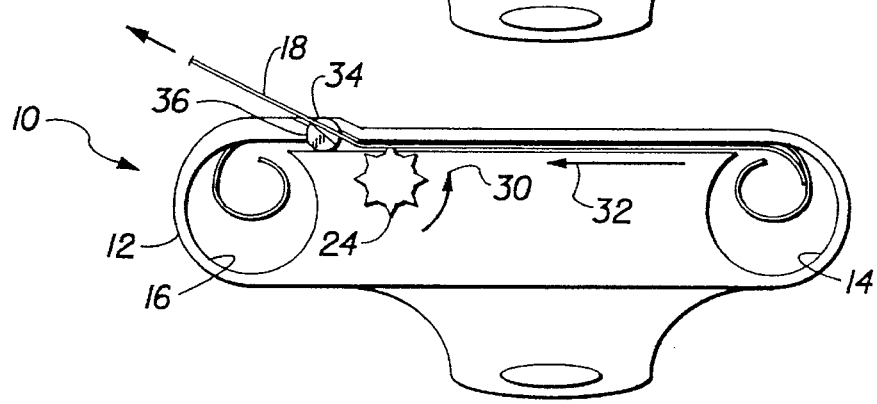

A light lock/film guide 36 is supported immediately inward of the slot 34 for movement between an open or first guide position either to longitudinally direct the filmstrip 18 from the slot to the sprocket 24, as shown in FIG. 1, or to longitudinally direct the filmstrip from the sprocket to the slot, as shown in FIG. 5, and a closed or second guide position either to longitudinally direct the filmstrip from the sprocket to the exposed film chamber 16, as shown in FIGS. 2 and 3, or to longitudinally direct the filmstrip from the exposed film chamber to the sprocket, as shown in FIG. 3 and 4, and to light tightly close the slot.

In operation, the filmstrip 18 is longitudinally inserted through the slot 34, over the light lock/film guide 36 in its opened or first guide position, to the sprocket 24. See FIG. 1. The sprocket 24 is rotated in engagement with the filmstrip 18 in the forward sprocket direction 26 to longitudinally move the filmstrip in the forward film direction 28 to the unexposed film chamber 14. See FIG. 2. After each exposure, the sprocket 24 is rotated in engagement with the filmstrip 18 in the reverse sprocket direction 30 to longitudinally move successive sections of the filmstrip in the reverse film direction 32, under the light lock/film guide 36 in its closed or second guide position, to the exposed film chamber 16. See FIG. 3. When most of the filmstrip 18 has been exposed, the sprocket 24 is rotated in engagement with the filmstrip 18 in the forward sprocket direction to longitudinally move the filmstrip in the forward film direction 28 from the exposed film chamber 16, under the light lock/film guide 36 in its closed or second guide position, to the unexposed film chamber 14. See FIG. 4. Then, the sprocket 24 is rotated in engagement with the filmstrip 18 in the reverse sprocket direction 30 to longitudinally move the filmstrip in the reverse film direction 32, from the unexposed film chamber 14, over the light lock/film guide in its open or first guide position, through the slot 34 and out of the camera body 12. See FIG. 5.

ALTERNATIVE EMBODIMENT

Figure 6:
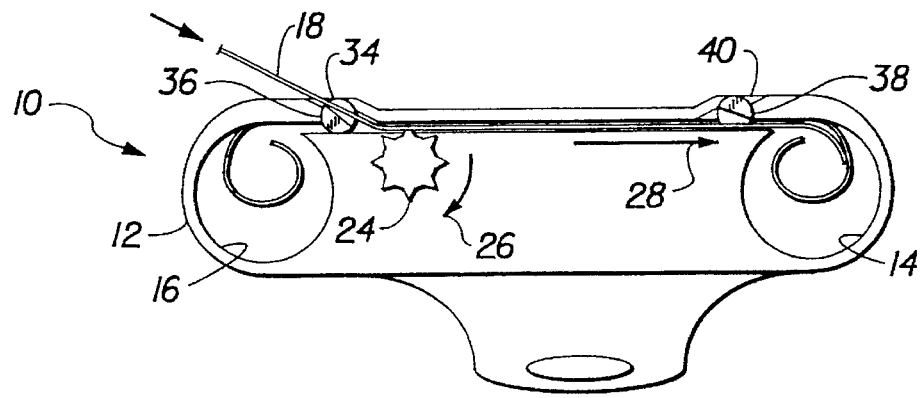
FIGS. 6–9 are schematic plan views of an alternate embodiment of a photographic camera with film, depicting a method of loading and unloading a filmstrip in and from the photographic camera.
Figure 7:
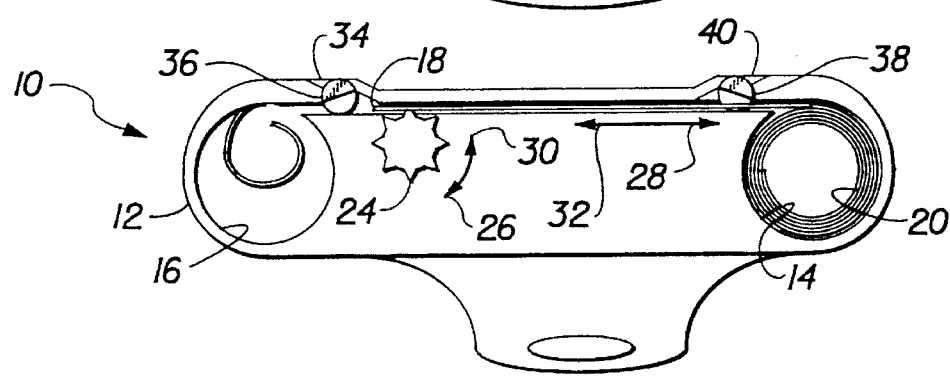
Figure 8:
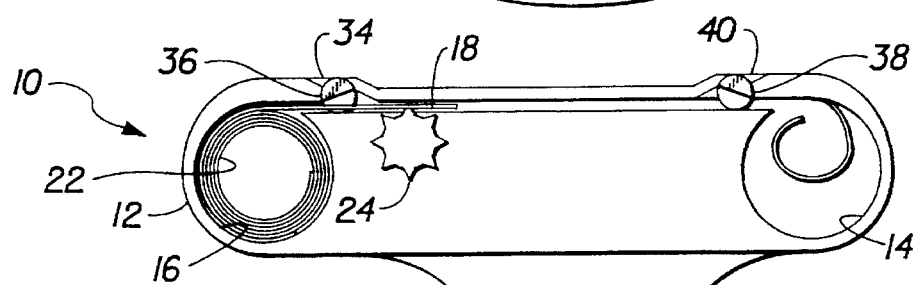
Figure 9:
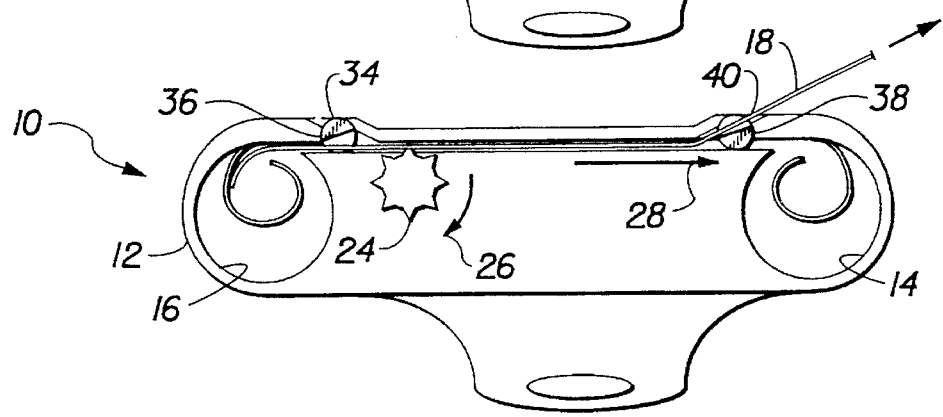

As shown in FIGS. 6–9, each of the components are the same except for an additional slot 38 located on the rear of the camera body 12, which serves as a film-egress slot, i.e. the slot 34 only serves as a film-ingress slot in this instance, and an additional light lock/film guide 40. The light lock/film guide 40 is supported immediately inward of the slot 38 for movement between a closed or first guide position to light tightly close the slot 38 and either to longitudinally direct the filmstrip 18 from the sprocket 24 to the unexposed film chamber 24, as shown in FIGS. 6 and 7, or from the unexposed film chamber to the sprocket, as shown in FIGS. 7 and 8, and an open or second guide position to longitudinally direct the filmstrip from the sprocket to the slot 38, as shown in FIG. 9.

In operation, the filmstrip 18 is longitudinally inserted through the slot 34, over the light lock/film guide 36 in its opened or first guide position, to the sprocket 24. See FIG. 6. The sprocket 24 is rotated in engagement with the filmstrip 18 in the forward sprocket direction 26 to longitudinally move the filmstrip in the forward film direction 28, under the light lock/film guide 40 in its closed or first guide position, to the unexposed film chamber 14. See FIG. 7. After each exposure, the sprocket 24 is rotated in engagement with the filmstrip 18 in the reverse sprocket direction 30 to longitudinally move successive sections of the filmstrip in the reverse film direction 32, under the light lock/film guide 40 in its closed or first guide position and under the light lock/film guide 36 in its closed or second guide position, to the exposed film chamber 16. See FIG. 8. When most of the filmstrip 18 has been exposed, the sprocket 24 is rotated in engagement with the filmstrip 18 in the forward sprocket direction to longitudinally move the filmstrip in the forward film direction 28 from the exposed film chamber 16, under the light lock/film guide 36 in its closed or second guide position and over the light lock/film guide 40 in its open or second guide position, to the slot 38 and out of the camera body 12. See FIG. 9.

The invention has been described with reference to a preferred embodiment. However, it will be appreciated that variations and modifications can be effected by a person of ordinary skill in the art without departing from the scope of the invention.

PARTS LIST 10. single-use camera
12. camera body
14. unexposed film chamber
16. exposed film chamber
18. filmstrip
20. unexposed film roll
22. exposed film roll
24. film advancing sprocket
26. forward sprocket direction
28. forward film direction
30. reverse sprocket direction
32. reverse film direction
34. film-ingress/film-egress slot
36. light lock/film guide
38. additional slot 38
40. additional light lock/film guide

I claim:

1. A method of loading a filmstrip in a photographic camera and unloading the filmstrip from the camera, comprising the successive steps of:

longitudinally inserting a filmstrip through an exterior slot into the camera to load the filmstrip in the camera;

advancing the filmstrip in a forward direction from the exterior slot to an unexposed film chamber;

advancing successive sections of the filmstrip in a reverse direction to an exposed film chamber after each film exposure; and advancing the filmstrip from the exposed film chamber through the same or a different slot to unload the filmstrip from the camera.

2. A method of loading a filmstrip in a photographic camera and unloading the filmstrip from the camera, comprising the successive steps of:

longitudinally inserting a filmstrip through an exterior slot into the camera to load the filmstrip in the camera;

advancing the filmstrip in a forward direction from the exterior slot to an unexposed film chamber;

advancing successive sections of the filmstrip in a reverse direction to an exposed film chamber after each film exposure;

advancing the filmstrip in the forward direction from the exposed film chamber to the unexposed film chamber; and advancing the filmstrip in the reverse direction from the unexposed film chamber through the exterior slot to unload the filmstrip from the camera.

3. A method of loading a filmstrip in a photographic camera and unloading the filmstrip from the camera, comprising the successive steps of:

longitudinally inserting a filmstrip through an exterior film-ingress slot into the camera to load the filmstrip in the camera;

advancing the filmstrip in a forward direction from the film-ingress slot to an unexposed film chamber;

advancing successive sections of the filmstrip in a reverse direction to an exposed film chamber after each film exposure; and advancing the filmstrip in the forward direction from the exposed film chamber through a film-egress slot out of the camera to unload the filmstrip from the camera.

4. A photographic camera comprising a camera body formed with an unexposed film chamber and an exposed film chamber for storing a filmstrip in respective unexposed and exposed film rolls, is characterized by:

an exterior slot located on said camera body to permit the filmstrip to be inserted through said slot to load the filmstrip into the camera body; and film advancing means for advancing the filmstrip in a forward direction from said slot to said unexposed film chamber and for advancing successive sections of the filmstrip in a reverse direction to said exposed film chamber after each film exposure, and for advancing the filmstrip from the exposed film chamber through the slot to unload the filmstrip from said camera body.

5. A photographic camera as recited in claim 4, further characterized by:

a film guide supported for movement between a first guide position to direct the filmstrip from said slot to said film advancing means when the film advancing means is to advance the filmstrip in the forward direction to said unexposed film chamber and a second guide position to longitudinally direct the filmstrip from the film advancing means to said exposed film chamber when the film advancing means is to advance the filmstrip in the reverse direction to the exposed film chamber.

6. A photographic camera as recited in claim 5, wherein said film guide is configured to lightightly close said slot when the film guide is in its second guide position and to open the slot when the film guide is in its first position.

7. A photographic camera comprising a camera body formed with an unexposed film chamber and an exposed film chamber for storing a filmstrip in respective unexposed and exposed film rolls, is characterized by:

a film-ingress slot located on said camera body to permit the filmstrip to be inserted through said film-ingress slot to load the filmstrip into the camera body;

a film-egress slot located on said camera body to permit the filmstrip to be advance through said film egress-slot to unload the filmstrip from the camera body; and film advancing means for advancing the filmstrip in a forward direction from said film-ingress slot to said unexposed film chamber and for advancing successive sections of the filmstrip in a reverse direction to said exposed film chamber after each film exposure, and for advancing the filmstrip from the exposed film chamber through said film-egress slot to unload the filmstrip from said camera body.

8. A photographic camera as recited in claim 7, further characterized by:

a first film guide supported for movement between a first guide position to longitudinally direct the filmstrip from said film-ingress slot to said film advancing means when the film advancing means is to advance the filmstrip in the forward direction and a second guide position to longitudinally direct the filmstrip from the film advancing means to said exposed film chamber when the film advancing means is to advance the filmstrip in the reverse direction; and a second film guide supported for movement between a first guide position to longitudinally direct the filmstrip from said film advancing means to said unexposed film chamber when said first film guide is in its first guide position and the film advancing means is to advance the filmstrip in in the forward direction and a second guide position to longitudinally direct the filmstrip from the film advancing means to said film-egress slot when the first film guide is in its second guide position and the film advancing means is to advance the filmstrip in the forward direction.

9. A photographic camera as recited in claim 8, wherein said first film guide is configured to lightightly close said film-ingress slot when the first film guide is in its second guide position and to open the film-ingress slot when the first film guide is in its first position, and said second film guide is configured to lightightly close said film-egress slot when the second film guide is in its first guide position and to open the film-egress slot when the second film guide is in its second position.

10. A photographic camera for exposing a filmstrip comprising:

a film-ingress slot located to permit the filmstrip to be inserted inwardly through said film-ingress slot to load the filmstrip into said camera;

a film-egress slot located to permit the filmstrip to be advanced outwardly through said film egress-slot to unload the filmstrip from said camera; and film advancing means for advancing the filmstrip from said film-ingress slot to expose the filmstrip in said camera and for advancing the filmstrip through said film-egress slot from said camera after the filmstrip is exposed.

\* \* \* \* \*